United States Patent [19]

Luciani et al.

[11] Patent Number: 5,361,487
[45] Date of Patent: Nov. 8, 1994

[54] METHODS FOR CONNECTING INTERMEDIATE STATOR COIL LEADS

[75] Inventors: Sabatino Luciani; Massimo Ponzio; Antonio Lumini, all of Florence, Italy

[73] Assignee: Axis U.S.A., Inc., Marlborough, Mass.

[21] Appl. No.: 67,297

[22] Filed: May 25, 1993

Related U.S. Application Data

[60] Division of Ser. No. 809,233, Dec. 17, 1991, Pat. No. 5,233,751, which is a continuation of Ser. No. 529,183, May 25, 1990, abandoned.

[51] Int. Cl.⁵ ......................................... H02K 15/085
[52] U.S. Cl. .................................... 29/596; 29/732; 310/71
[58] Field of Search ............... 29/596, 598, 732, 736; 310/42, 71

[56] References Cited

U.S. PATENT DOCUMENTS

| | | | |
|---|---|---|---|
| 2,669,771 | 2/1954 | Burge et al. | 29/205 |
| 3,156,037 | 11/1964 | Warner | 29/205 |
| 3,474,515 | 10/1969 | Dammar | 29/205 |
| 3,675,300 | 7/1972 | Reust et al. | 29/205 C |
| 3,747,187 | 7/1973 | Colwell | 29/203 D |
| 3,812,570 | 5/1974 | Mason | 29/205 D |
| 3,818,570 | 6/1974 | Del Bono | 29/205 C |
| 3,927,456 | 12/1975 | Dammar | 29/205 C |
| 4,000,764 | 1/1977 | Reiger, Jr. | 140/113 |
| 4,074,418 | 2/1978 | Pearsall | 29/596 |
| 4,428,113 | 1/1984 | Fischer et al. | 29/736 |
| 4,553,319 | 11/1985 | Fischer et al. | 29/596 |
| 4,648,176 | 3/1987 | Moser | 29/596 |
| 4,694,560 | 9/1987 | Barrera | 29/564.1 |
| 4,827,601 | 5/1989 | Banner | 29/597 |
| 4,926,079 | 5/1990 | Niemela et al. | 310/71 |
| 4,951,379 | 9/1990 | Clemenz | 29/597 |
| 4,974,313 | 12/1990 | Reiger, Jr. | 29/736 |
| 5,029,379 | 7/1991 | Niemela et al. | 29/596 |

FOREIGN PATENT DOCUMENTS 61-94529 5/1986 Japan.

*Primary Examiner*—Carl E. Hall
*Attorney, Agent, or Firm*—Nicola A. Pisano

[57] ABSTRACT

Methods and apparatus are provided for generating and connecting an intermediate lead wire extending between multiple portions of a coil wound on a pole of a stator core to a slotted terminal mounted on the stator core. Such stator cores, wound by coil winding shuttles, are used in electric motors, generators and similar devices. An intermediate lead wire extending between multiple portions of a coil is first captured by a hook mechanism, aligned with a slotted terminal, and then inserted in the terminal by a wire insertion device. The wire is then held in engagement with the terminal while the next portion of the coil is begun, producing an intermediate lead wire connection wherein a first portion of the lead wire is engaged within a slot in the terminal and the portion extending from the terminal to the next coil portion is wrapped tightly against the exterior of the terminal. In accordance with the principles of this invention, no cutting of the intermediate lead wire is required.

16 Claims, 13 Drawing Sheets

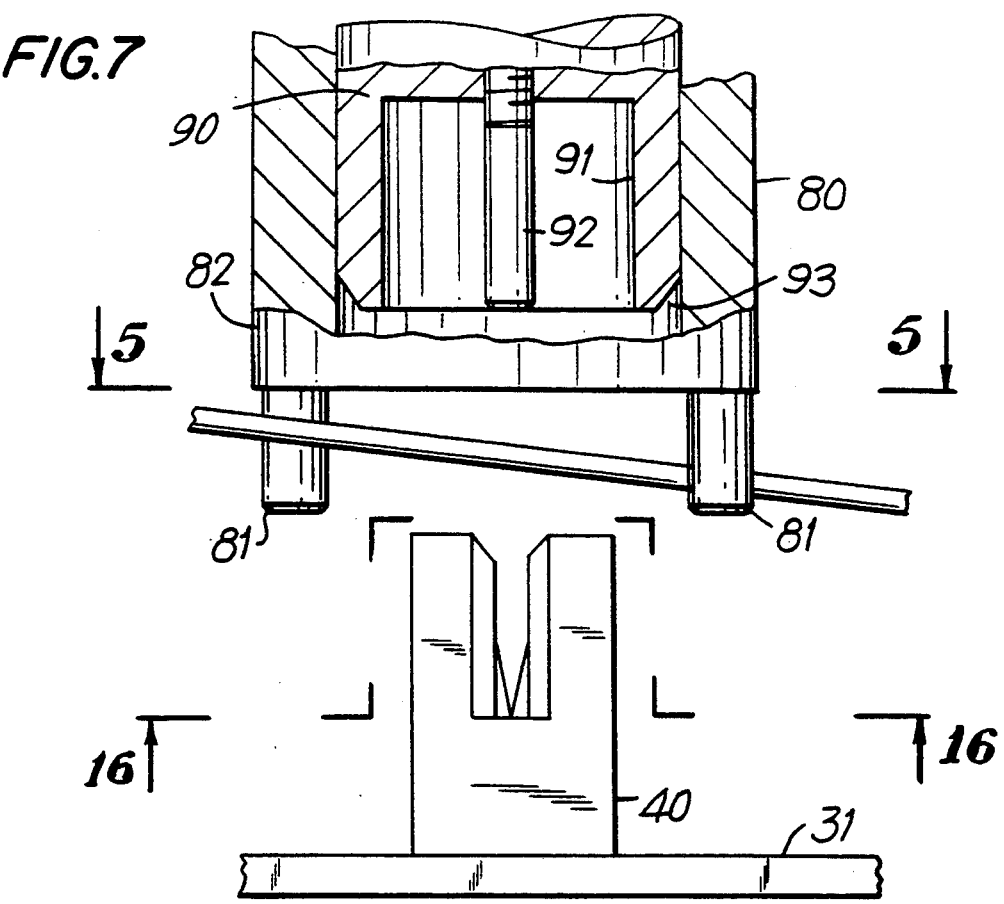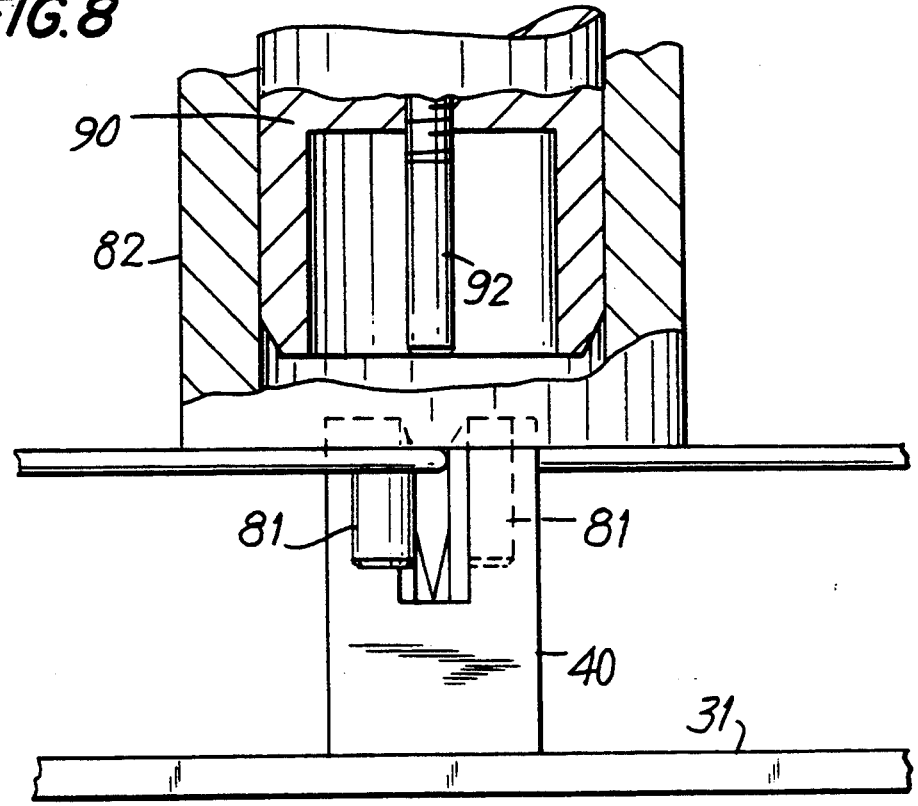

METHODS FOR CONNECTING INTERMEDIATE STATOR COIL LEADS

This is a division of application Ser. No. 07/809,233, filed Dec. 17, 1991 now U.S. Pat. No. 5,233,751, entitled METHOD AND APPARATUS FOR CONNECTING INTERMEDIATE STATOR COIL LEADS; which is a continuation of application Ser. No. 07/529,183, filed May 25, 1990, entitled METHOD AND APPARATUS FOR CONNECTING INTERMEDIATE STATOR COIL LEADS, abandoned.

BACKGROUND OF THE INVENTION

This invention relates to methods and apparatus for making stators for electric motors and similar machines such as generators. Although the invention is described herein in the context of its application to electric motor stators, it will be understood that it is equally applicable to other types of stators having intermediate lead wires extending from multiple coil portions wound on each stator pole.

Intermediate terminals extending from multiple coil portions wound on a stator pole are frequently required on electric motors for commutating motor speed and for other requirements. While in recent years machines have been developed to automatically wind stator coils and to connect the lead wires to terminal boards mounted on the stator core, for example, Pearsall U.S. Pat. No. 4,074,418, these machines cannot be used to automatically mount intermediate lead wires on the terminal board. Other methods and apparatus for automatically mounting the ends of stator windings to terminal boards are described in several patents, such as Fischer U.S. Pat. No. 4,428,113, Fischer U.S. Pat. No. 4,553,319, and Reiger, Jr., U.S. Pat. No. 4,000,764. While all of these devices have in common the capability to mount the ends of the stator coil windings to the terminal boards, none is capable of automatically mounting intermediate lead wires. Prior to this invention, intermediate lead wires were generated by interrupting the automatic operation of the winding machine and grasping a strand of wire between the coil portions mounted on a stator. When the winding operation was complete, the strand of wire was manually secured to the terminal board.

In view of the foregoing, it is an object of this invention to provide methods and apparatus for automatically connecting the intermediate lead wires from multiple coil portions wound on a stator pole to terminal means mounted on the stator terminal board.

Another problem is that the previously known machines described in the above patents had to be designed and built for specific configurations of terminal means mounted on the terminal board. None of these relatively complex machines could be readily adjusted to handle a wide variation in the location of the terminal means mounted on the stator terminal board.

It is therefore another object of this invention to provide an apparatus for automatically connecting the intermediate lead wires from multiple coil portions wound on a stator pole to terminal means mounted on the stator terminal board wherein the apparatus can be readily adjusted to account for variation in the placement of the terminal means on the terminal board.

Another problem with the existing method of generating intermediate lead wires is that after the winding is complete, the further manual step of cutting the intermediate lead wires and permanently affixing the wires to the terminal board is required. In addition to requiring manual effort, this latter step also involves some waste of wire.

In view of these considerations, it is still another object of this invention to provide methods and apparatus for permanently affixing the intermediate lead wires to the stator terminal board in a single operation, and with a minimum of wire waste.

SUMMARY OF THE INVENTION

These and other objects of the invention are accomplished in accordance with the principles of the invention by automatically connecting the intermediate lead wires extending between multiple coil portions wound on a pole of a stator core to terminal means located on the stator terminal board in a single operation requiring no further manual effort and which conserves wire relative to existing methods. As will be apparent from the following description, the apparatus of the invention is located at the winding machine.

The present invention is described with reference to terminal means generally having a hollow housing with a slot extending transversely through and axially down opposite walls of the housing, the walls defining a slot which is relatively wide at the top and tapered to a narrow base, so that a wire inserted transverse to the slots is frictionally engaged. Such terminal connection means are widely known in the field as AMP style terminals. The terminals are mounted on an electrically nonconducting terminal board which is mounted on an end face of the stator core.

Once a predetermined number of turns of coil wire have been wound on a stator pole by a coil winding shuttle, the apparatus of this invention yieldably grasps the strand of wire extending between the coil and the winding shuttle and positions the wire within a slot in the terminal means located on the stator terminal board. The apparatus retains the strand in engagement with the terminal means so that when the winding shuttle resumes operation the strand of wire is wrapped tightly against the exterior of the terminal means. The apparatus includes wire grasping and positioning means which cooperate with the coil winding shuttle and which are movable along three axes relative to the stator terminal board, so that the intermediate lead wires may be connected to terminal means located in any position and with any orientation relative to the stator core that is desirable for the specific stator application.

This invention includes method steps performed in sequence for generating the intermediate lead wires and for connecting the wires to the terminal means. In accordance with the principles of this invention, no cutting of the intermediate lead wire is involved in connecting the intermediate lead wire to the terminal means.

Further features of the invention, its nature and various advantages will be more apparent from the accompanying drawings and the following detailed description of the preferred embodiments.

BRIEF DESCRIPTION OF THE DRAWINGS

FIG. 5 includes elements viewed along the line 5—5 in FIG. 7.

FIG. 7 is a fragmentary sectional view of the wire insertion device taken along the line 7—7 in FIG. 5.

FIGS. 8 and 9 are views similar to that in FIG. 7, showing successive stages in the operation of the wire insertion device.

DETAILED DESCRIPTION OF THE PREFERRED EMBODIMENTS

Figure 1:
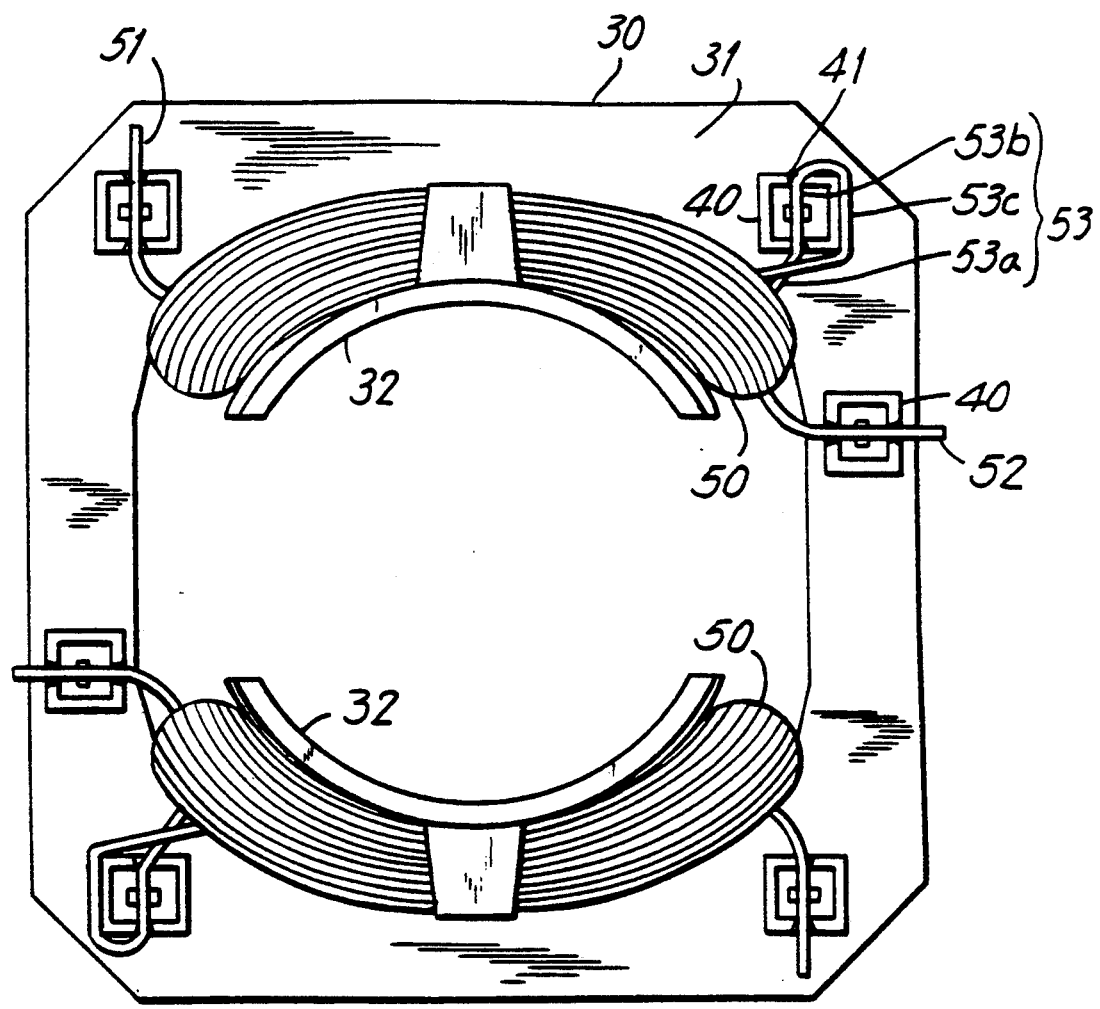
FIG. 1 is an axial end view of an illustrative embodiment of a stator whose intermediate lead wires have been connected to the terminal means located on the stator terminal board in accordance with the principles of this invention.

FIG. 1 shows an axial end view of an illustrative embodiment of a stator 30. Coils of wire 50 are wound on each of the upper and lower poles 32 of stator 30. An electrically nonconducting terminal board 31 is affixed to each end of stator core 30, and has terminal means 40 mounted at predetermined positions on terminal board 31. Terminal means 40 is preferably of the AMP style, having a slot 41 which for purposes of illustration is aligned parallel to the vertical edge of stator 30. Each coil 50 has a start lead 51 and an end lead 52. An intermediate lead wire, generally designated 53, and having portions 53a, 53b, and 53c as shown in FIG. 1, has been connected to terminal means 40 in accordance with the principles of this invention such that no cutting of the intermediate lead wire is involved.

Figure 2:
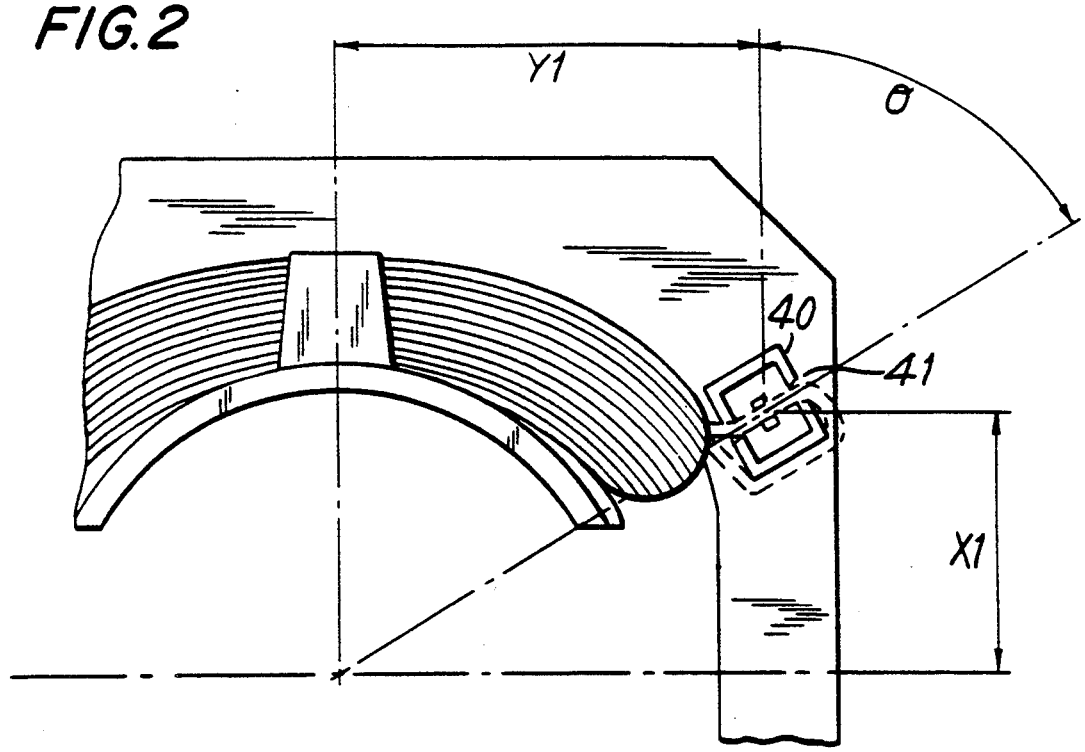
FIG. 2 is a partial axial end view of an alternative positioning of the intermediate lead wire terminal means on the stator terminal board.

FIG. 2 shows a terminal means 40 having its slot 41 aligned substantially radially with respect to the center of stator core 30. As will be described below, the apparatus of the present invention can be used with the terminal means 40 positioned at any location with respect to the horizontal (Y1) and vertical (X1) axes of the stator and with slot 41 at any angular orientation (Θ).

Figure 3:
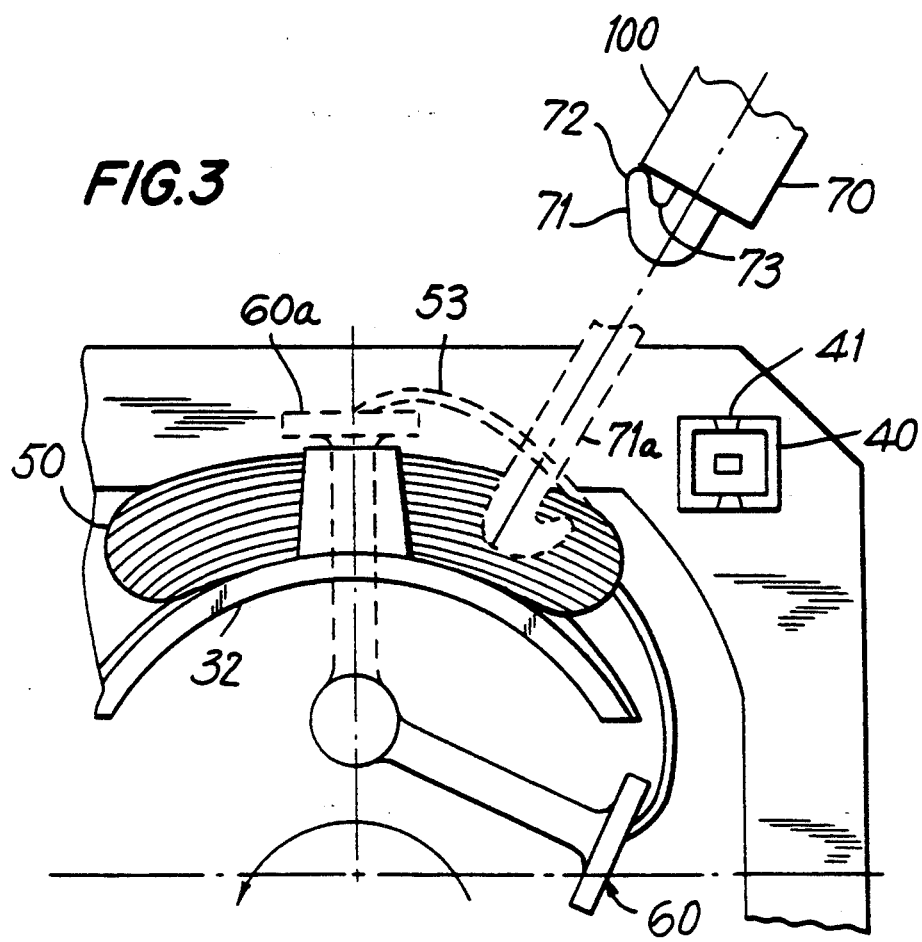
FIGS. 3, 4, 5, and 6 illustrate by fragmentary axial views of the stator end the sequence of steps of connecting the intermediate lead wire to the terminal means.

Referring to FIG. 3, a first portion of coil 50 has been wound on stator pole 32 by oscillatory and reciprocatory movement of winding shuttle needle 60. The shuttle needle 60 is stopped adjacent the end of stator core 30 which supports terminal means 40. Hook mechanism, generally designated 70, carries an elongated rod 71 having at one end a hook 72 with a groove 73 (see also FIG. 10). Rod 71 moves translatingly and rotatingly from a first position 71 shown in solid lines to a second position 71a shown in phantom lines. Shuttle needle 60 then rotates counterclockwise to a vertical position 60a shown in phantom lines, so that the strand of wire 53 extending from the first portion of coil 50 to shuttle needle 60 can be engaged by groove 73 of hook 72 at position 71a when hook 72 retracts.

Figure 4:
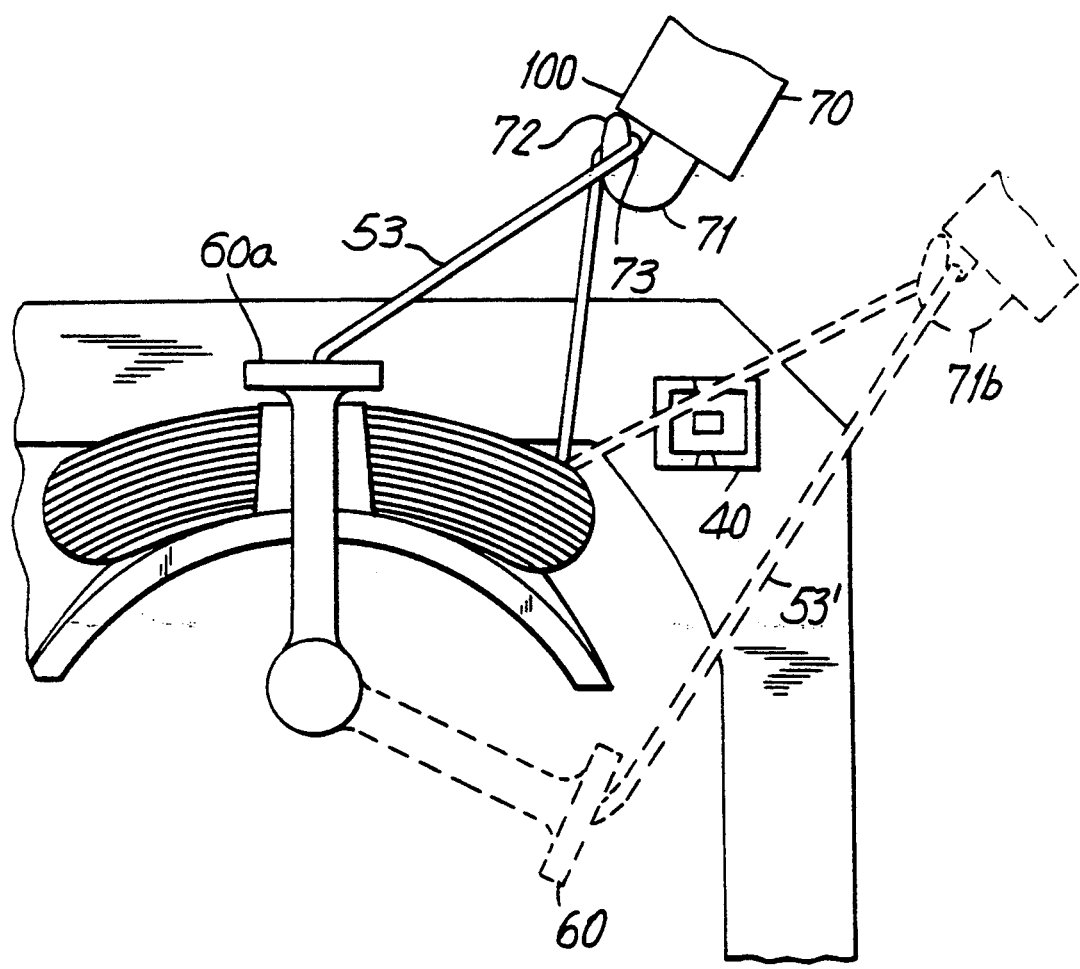

Referring now to the solid lines in FIG. 4, rod 71 has been retracted from its extended position 71a shown in FIG. 3 back to its original position 71, so that the tip of hook 72 abuts against support member 100 of hook mechanism 70. The strand of wire 53 is not gripped by hook 72, but is capable of sliding movement relative to hook 72, so that additional wire 53 may be drawn from shuttle needle 60a. Referring now to the phantom lines in FIG. 4, hook mechanism 70 is translated laterally with respect to stator terminal board 31 to a position 71b, and shuttle needle 60a is rotated clockwise back to its original position 60. These movements uncross wire 53 and move the portion of wire strand 53 between hook 72 and shuttle needle 60 out of the way of the wire insertion device, hereinafter described, to a position 53' adjacent terminal means 40.

As shown in FIG. 7, wire insertion device 80 is centered on terminal means 40. Insertion device 80 has a pair of wire guide bars 81 carried on the opposite ends of a diameter of a cylindrical sleeve 82. Sleeve 82 is capable of rotating about its axis, as well as translational movement relative to the stator terminal board 31. A shaft 90 is disposed slidingly and concentrically within sleeve 82, and has a hollow sleeve portion 91 at one end with wire insertion tool 92 mounted at the center of sleeve 91, so that the centers of guide bars 81 and insertion tool 92 lie along a diameter of wire insertion device 80. The inner diameter of the sleeve 91 is greater than that of the outer diameter of terminal means 40, while the diameter of wire insertion tool 92 is sized to freely enter the hollow portion of terminal means 40. Sleeve portion 91 of shaft 90 has a bevel 93 on its outer surface.

Figure 5:
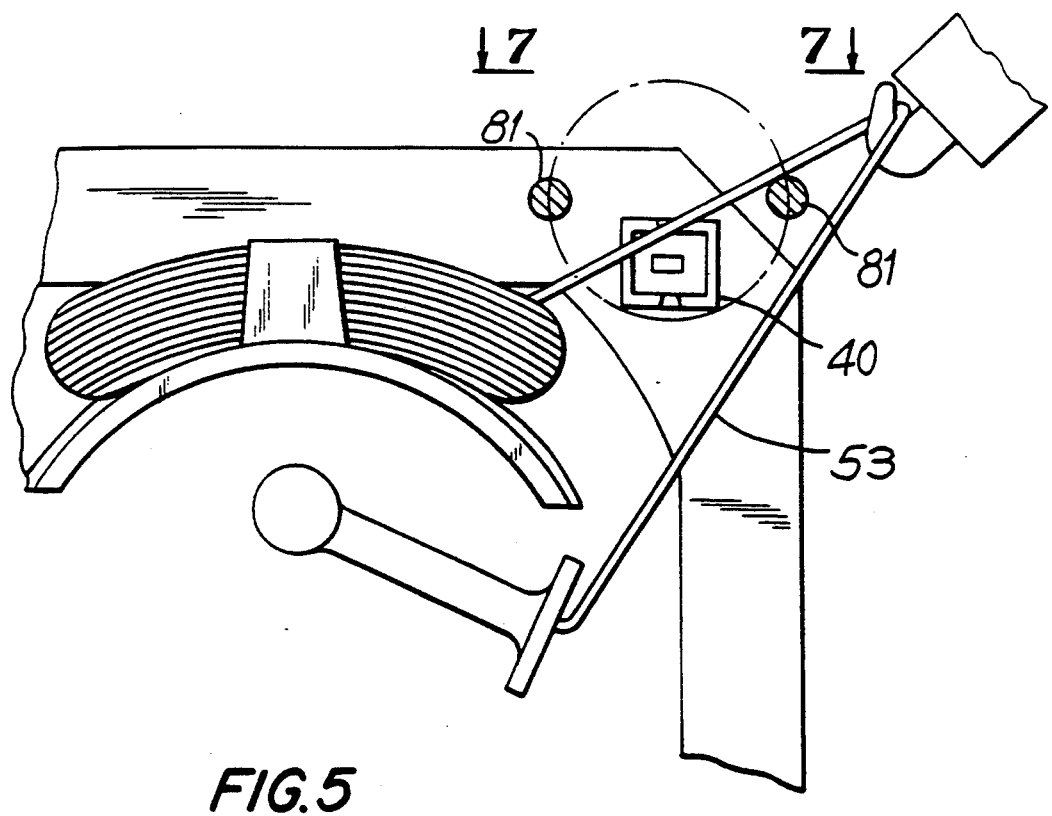

As depicted in FIG. 5 (which includes elements taken along the line 5—5 in FIG. 7), wire insertion device 80 has been moved into proximity with the stator terminal board so that guide bars 81 extend on opposite sides of the strand of wire 53 and before wire insertion device 80 is centered on terminal means 40.

Figure 6:
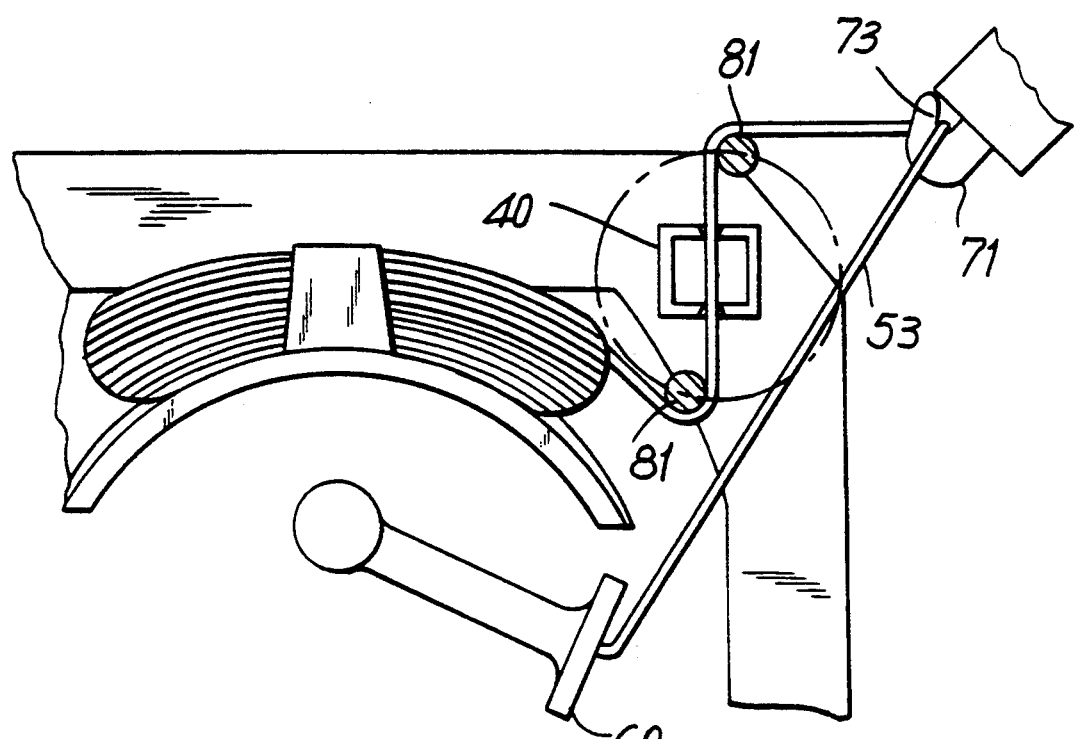
Figure 15:
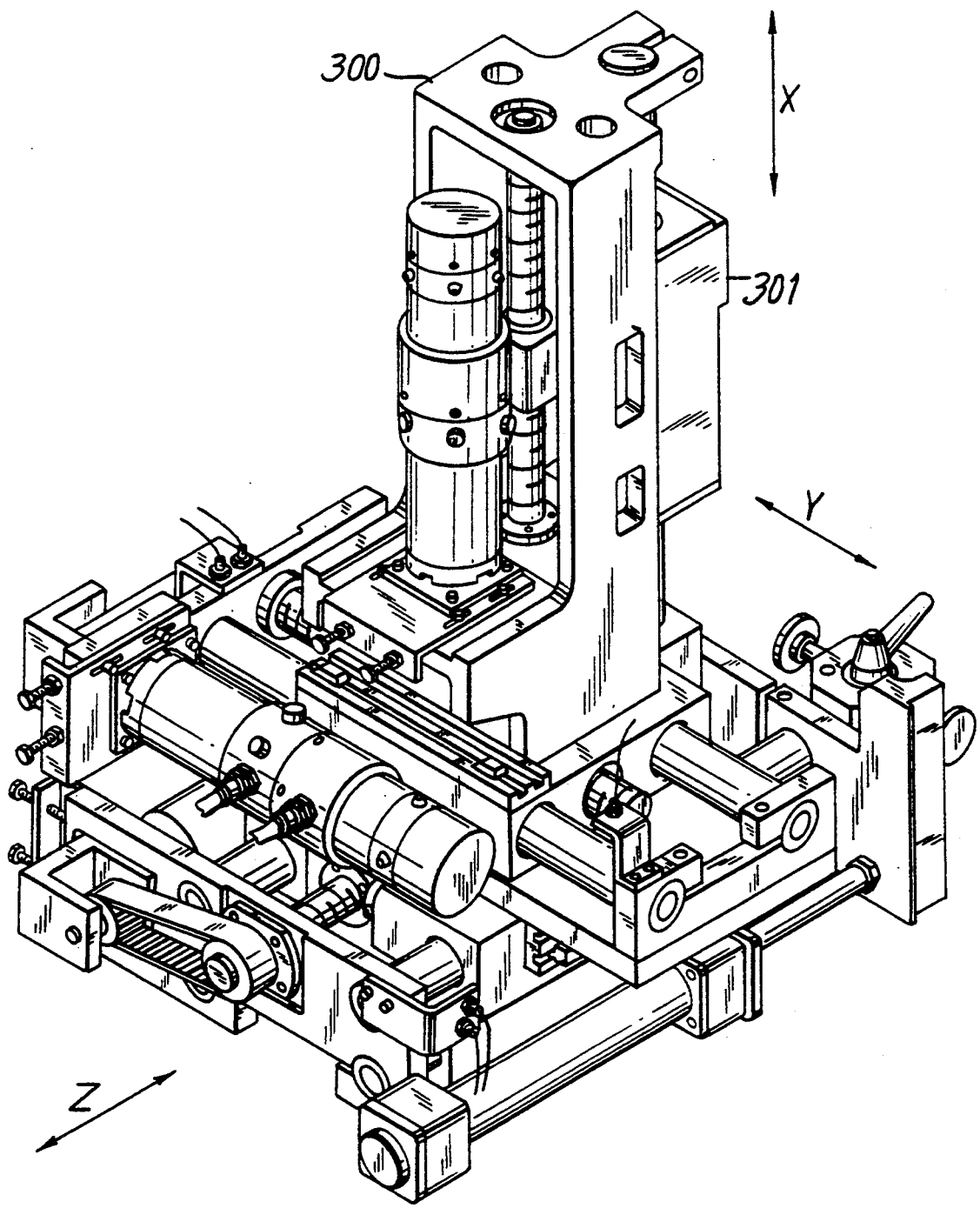
FIG. 15 is a perspective view of a three-axis platform suitable for use with the apparatus of the present invention.

In FIG. 6 wire insertion device 80 has been moved to a position centered on terminal means 40. Centering of wire insertion device 80 on terminal means 40 can be achieved, for example, by a numerically controlled three-axis platform such as that shown in FIG. 15 and generally designated 300. Platform 300 is preprogrammed for a predetermined location and orientation of terminal means 40 on terminal board 31, which programming may be readily modified by conventional methods for variation in the terminal means placement on the terminal board. In a first embodiment of the present invention, the hook mechanism need only be capable of sweeping movement relative to the stator terminal board, in which case wire 53 is engaged by guide bars 81 before wire insertion device 80 is centered on the terminal means. In an alternate embodiment, the hook mechanism 70 may be mounted on the slide 301 of platform 300, so that rod 71 is capable of movement in an arcuate path. In this second embodiment, the wire insertion device, which must be centered on the terminal means, need only be capable of translational movement toward and away from the stator terminal board 31.

Sleeve 82 is rotated through a predetermined arc to bring wire 53 into alignment with the slot 41 of terminal means 40 by action of wire 53 bearing against guide bars 81. During this rotation of sleeve 82, an additional length of wire 53 is drawn from shuttle needle 60, wire 53 freely sliding through the groove 73 of hook 72 and against guide bars 81.

Figure 9:
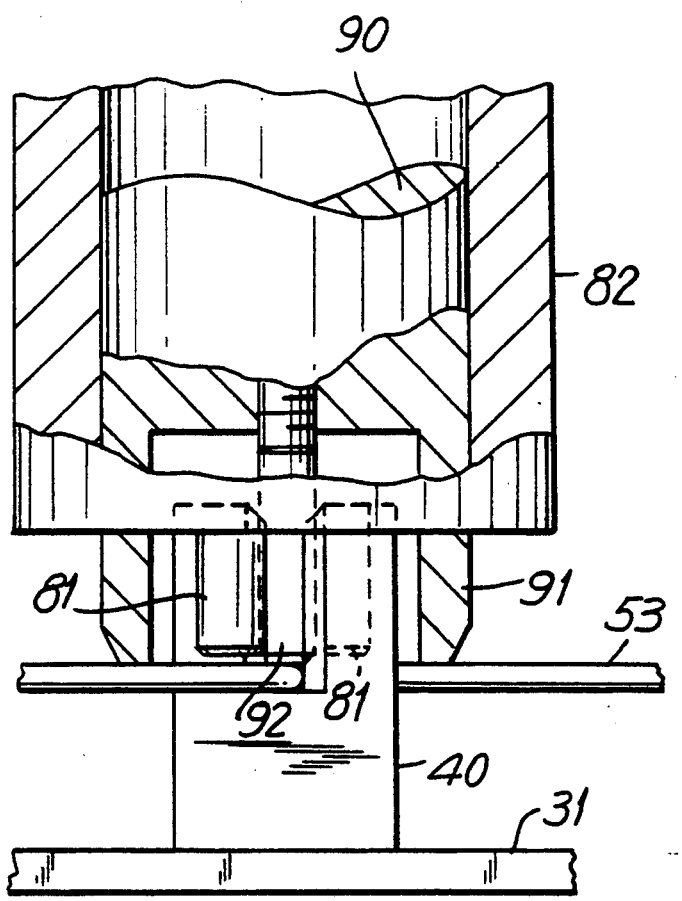

Referring now to FIGS. 8 and 9, wire insertion device 80 is translated toward terminal means 40 so that wire 53 is partially inserted in the opening of the slot 41 of terminal means 40 by the urging of sleeve 82. For clarity in the further description of this invention, the wire may now be referred to as having the three portions described with respect to FIG. 1: a first portion 53a tautly extending from a first portion of coil 50 to terminal means 40; a second portion 53b disposed within terminal means slot 41; and a third portion 53c extending from terminal means 40 to a second portion of coil 50. In FIG. 9 shaft 90 is translated toward terminal means 40 so that the sleeve portion 91 of shaft 90 surrounds the exterior of terminal means 40 while insertion tool 92 extends into the interior of terminal means 40, whereby insertion tool 92 urges wire portion 53b to the base of slot 41.

After the wire has been inserted in the slot 41 of terminal means 40, wire portion 53c is released from hook mechanism 70, described hereinafter. The sleeve 91 of shaft 90 urges wire portion 53b toward the base of the slot 41 of terminal means 40, while the bevel 93 of sleeve 91 prevents wire portion 53c from becoming wrapped inadvertantly around sleeve 91. Wire insertion tool 92 holds wire portion 53b in engagement with slot 41 of terminal means 40 while shuttle 60 is positioned to begin winding the next coil portion of coil 50 on pole 32. Shaft 90 and sleeve 82 are then translated away from terminal means 40 and winding shuttle 60 resumes winding of a second portion of coil 50 on stator pole 32, causing strand 53c to become wrapped tightly against the exterior surface of terminal means 40. This sequence of events results in a completed intermediate lead connection as shown in FIG. 1.

Figure 10:
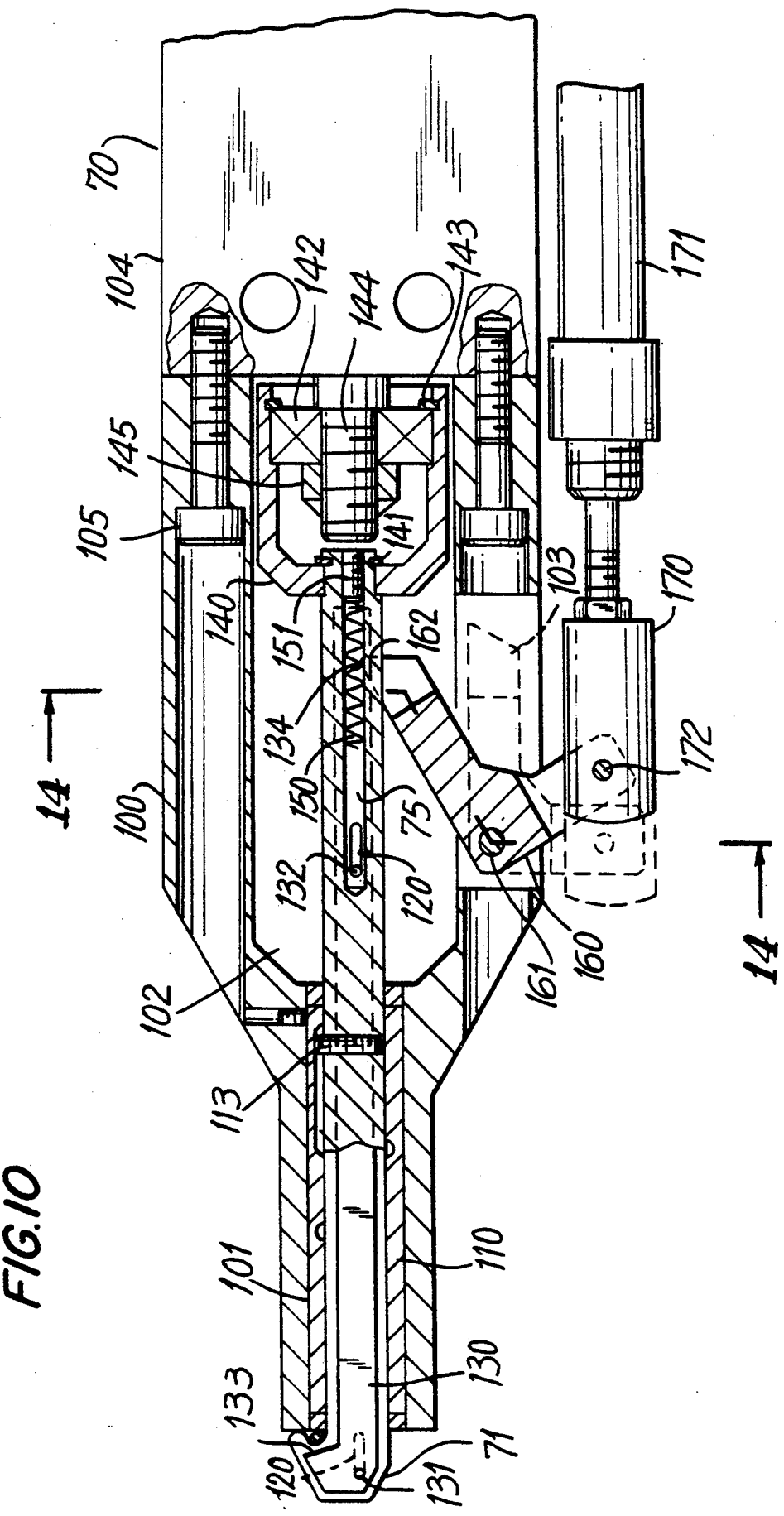
FIG. 10 is an elevational view, partly in section, of the wire/hook mechanism of the present invention.
Figure 11:
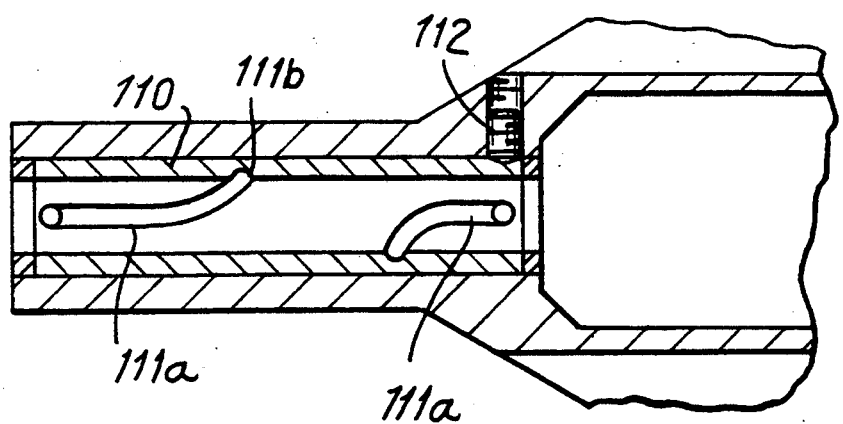
FIGS. 11 and 12 are sectional views illustrating internal details of the wire hook mechanism.
Figure 12:
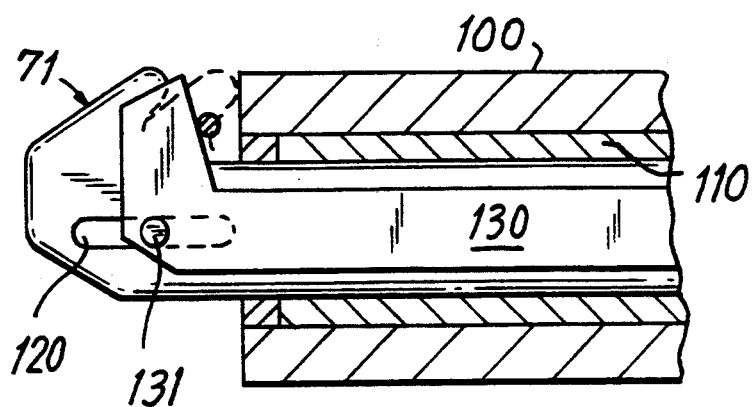

FIGS. 10, 11, and 12 show sectional views and details of hook mechanism 70. Hook mechanism 70 includes a support member 100 having a bore extending therethrough with a first portion 101 and a second portion 102, such that the second portion of the bore has a larger diameter than the first portion. Support member 100 is mounted to air cylinder 104 by fastening means such as bolts 105. Air cylinder 104 is mounted to a platform capable of movement in either one or three directions, such as platform 300 of FIG. 15, depending upon the specific embodiment selected from those described heretofore. A sleeve 110 having a groove 111 on its inner surface comprised of straight portions 111a and helical portions 111b, as shown in FIG. 11, is fixedly mounted in the first portion of bore 101 of support member 100 by fastening means, such as a screw 112. A pin 113 extending through rod 71 slides in groove portions 111a and 111b as rod 71 is translated through sleeve 110, whereby the helical portion 111b of the groove causes rod 71 to rotate about its axis to achieve the desired orientation relative to the stator terminal board, for example position 71a in FIG. 3. The straight portions 111a of the groove are designed so that rod 71 rotates only after wire 53 is captured in the groove 73 of hook 72.

Figure 13:
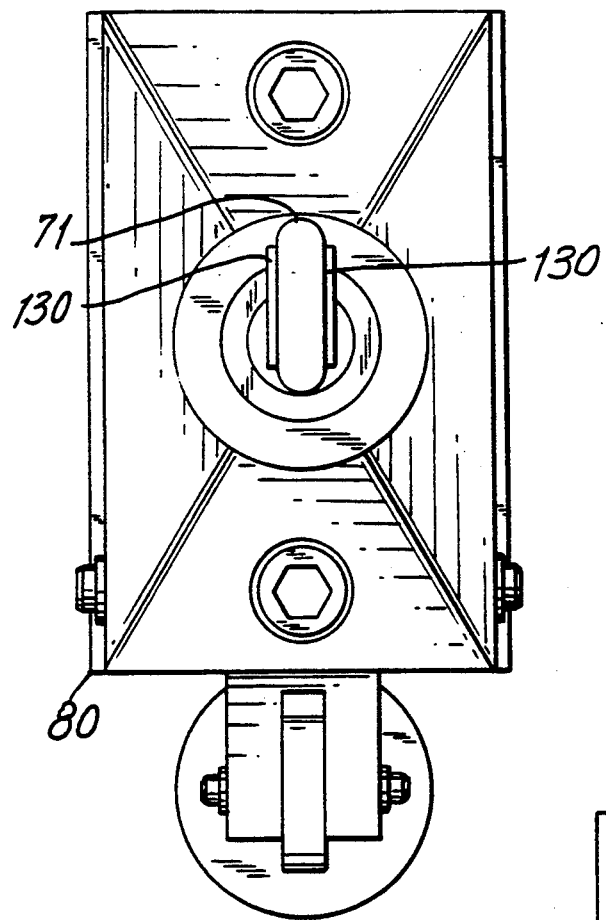
FIG. 13 is an axial end view of the wire hook mechanism.

Rod 71 has a pair of slots 120 and 121 through its thickness at two locations as shown in FIG. 10. A pair of plates 130 are positioned on opposite sides of rod 71 as shown in FIG. 13, the plates being joined by pins 131 and 132 extending through the slots 120 and 121 so that the plates are slideably movable relative to rod 71. Plates 130 have a sloped surface 133 near the groove 73 in hook 72 and recesses 134 located near the end opposite hook 72.

Bell-shaped member 140 is affixed to the end of rod 71 opposite the hook end 72, member 140 being fixedly secured to the end of rod 71 with a retainer ring 141. An outer race of bearing 142 is fixedly secured to member 140 by a retainer ring 143. The inner race of bearing 142 is fixedly secured to the piston rod 144 of air cylinder 104 by a suitable fastener, for example, a nut 145. This arrangement permits the translational movement of piston rod 144 of air cylinder 104 to be converted into translational and rotational movement of rod 71 as it slides along groove 111 of sleeve 110.

Rod 71 has a bore 75 extending inward from the end affixed to member 140 to a depth at least as deep as the end of slot 121. A compression spring 150 is disposed within the bore 75 of rod 71, with one end of the spring fixed to a screw 151 mounted in bore 75 and the other end urging pin 132 against the end of the slot 121 nearest the hook end 72. Spring 150 therefore biases plates 130 to a position clear of wire engaging hook 72.

Figure 14:
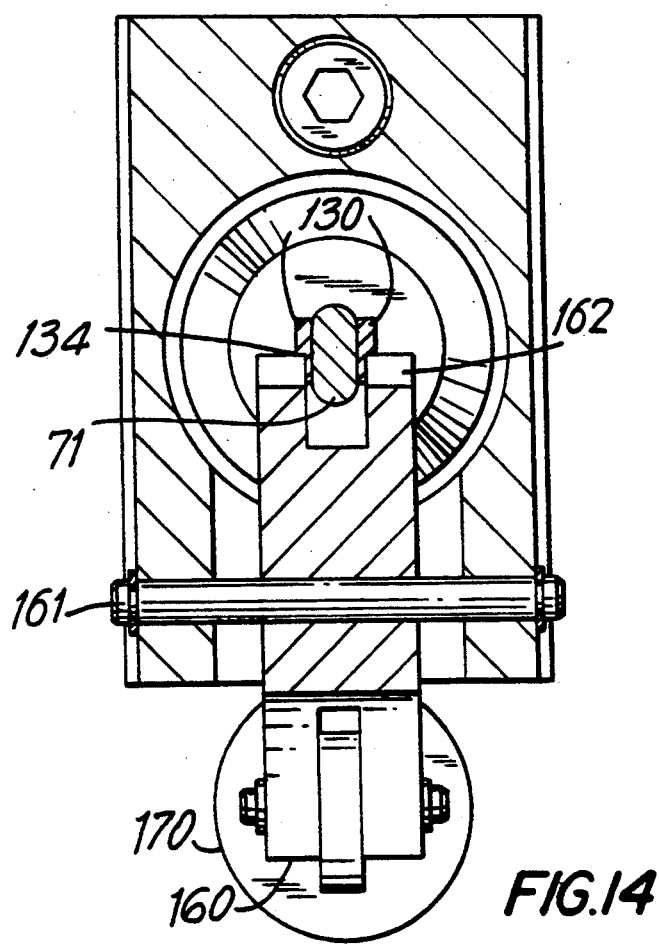
FIG. 14 is sectional view of the wire hook mechanism taken along the line 14—14 in FIG. 10.

Referring to FIGS. 10 and 14, a forked bell crank 160 is pivotally mounted in an opening 103 of support member 100 by pin 161. A first end of forked bell crank 160 is pivotally secured to a piston arm 170 of an air cylinder 171 by a pin 172. A second end of the forked bell crank extends into the second portion of the bore 102 in support member 100 through opening 103. The tips 162 of the second end of the forked bell crank engage recesses 134 in plates 130. The tips 162 of the second end of the forked member 160 are shown in FIG. 14 engaged in the recesses 134 of plates 130.

Referring again to FIG. 10, when the wire 53 is engaged in the groove 73 of hook 72 during the wire insertion phase, air cylinder 104 keeps piston rod 144 retracted, so that the tip of hook 72 bears against support member 100 of hook mechanism 70. Spring 150 keeps plates 130 clear of the groove 73 of hook 72 during the movement of rod 71 to capture wire 53. During the wire-engaging operation of the hook mechanism, forked bell crank 160 remains in the position shown in phantom lines in FIG. 10. Once the wire is inserted in terminal means 40, hook 72 must release wire portion 53c. First, piston arm 170 is retracted in cylinder 171 so that forked bell crank 160 rotates until its tips 162 are disposed within the recesses 134 of plates 130. Piston rod 144 of cylinder 104 is then slowly extended, thereby extending rod 71 and plates 130 in unison. However, after a short distance of travel the tips 162 of forked member 160 engage the ends of recesses 134 and prevent further extension of plates 130, while rod 71 continues to extend until pins 131 and 132 abut against the ends of slots 120 and 121. The relative motion between plates 130 and rod 71 results in the configuration shown in FIG. 12, such that wire 53 slides off the sloped surface 133 of plates 130 when winding shuttle 60 resumes winding the second portion of coil 50.

Figure 16:
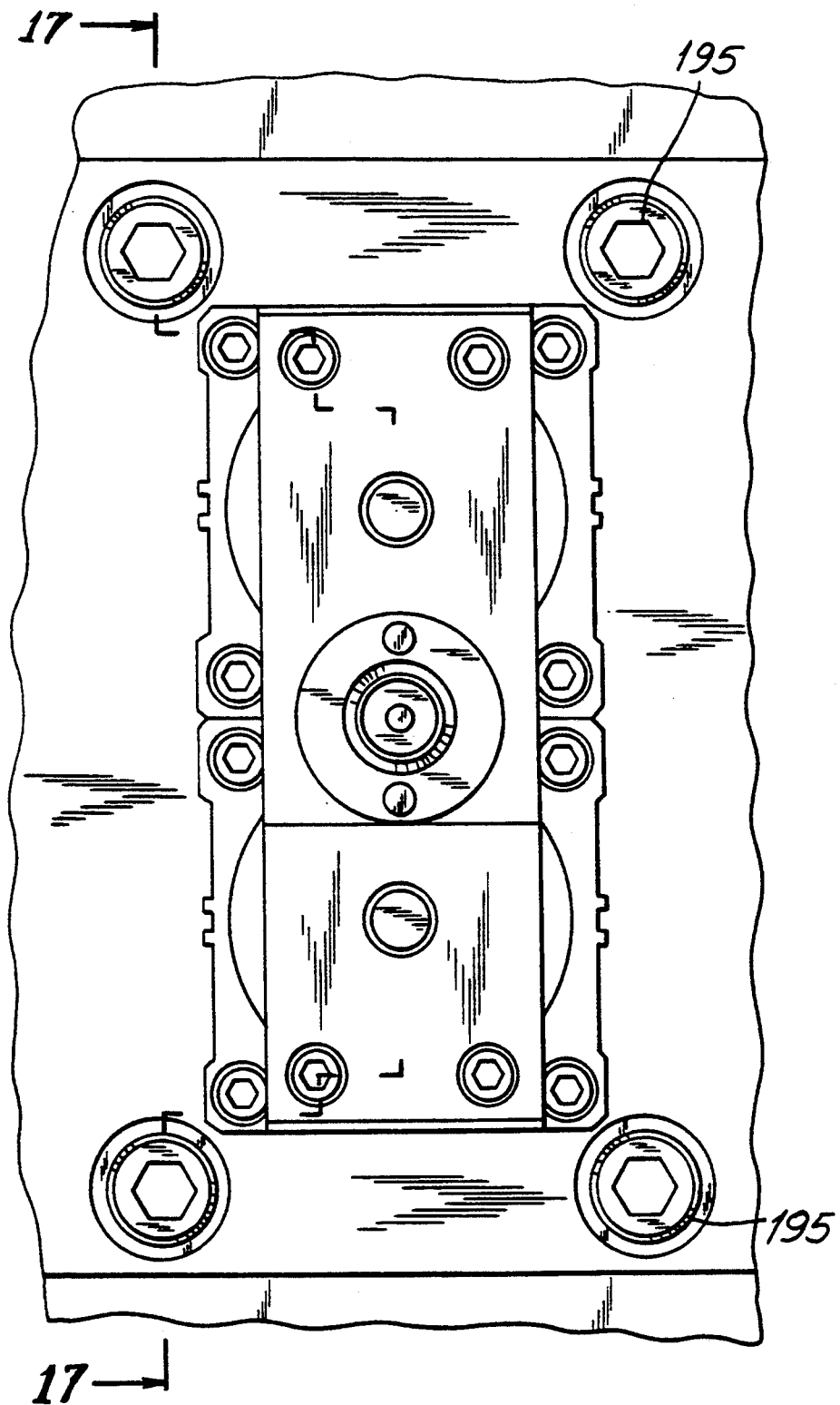
FIG. 16 is an axial end view of the wire insertion device of the present invention, taken along the line 16—16 in FIG. 7.
Figure 17:
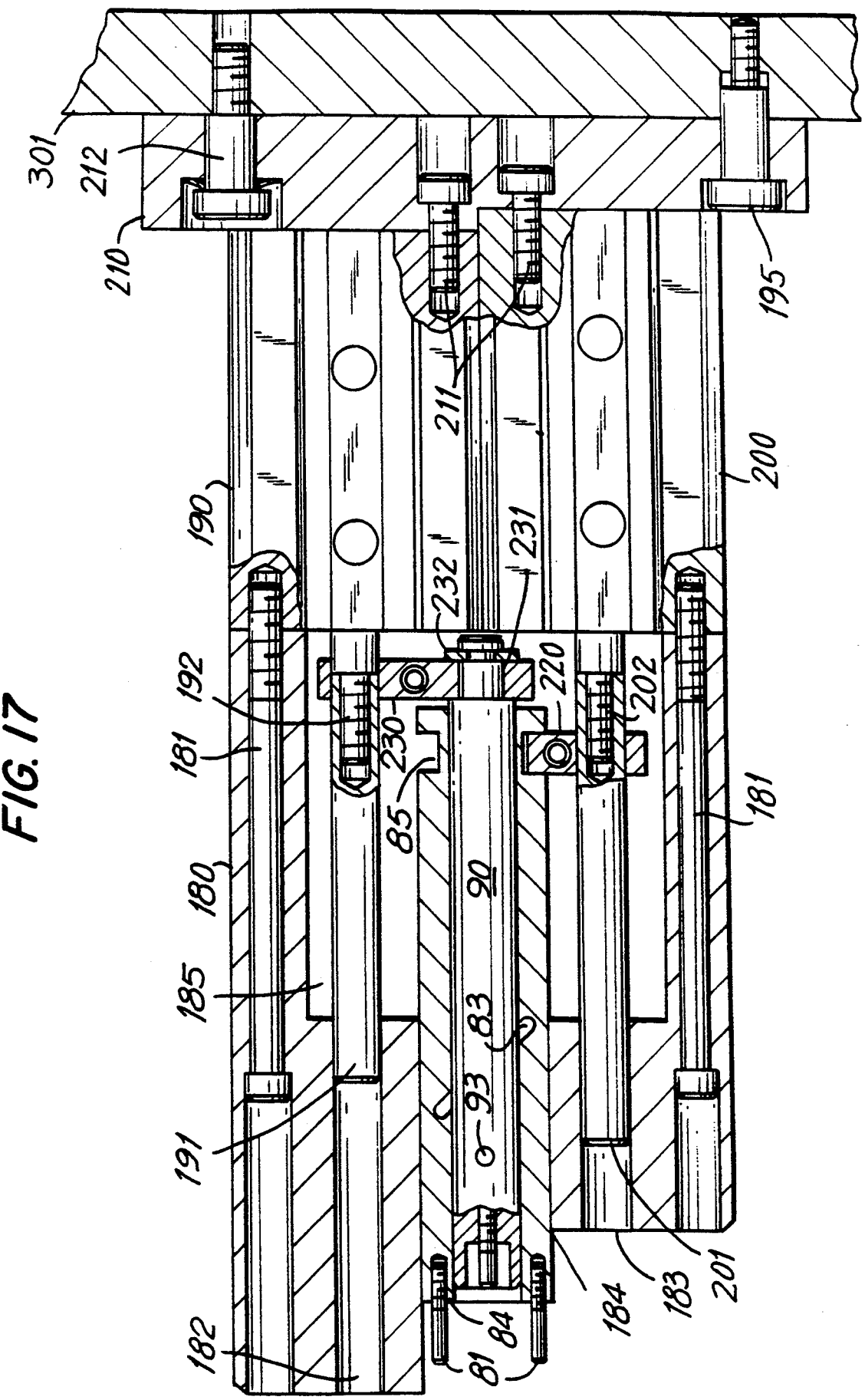
FIG. 17 is an elevational view, partly in section, of the wire insertion device taken along the line 17—17 in FIG. 16.

Referring to FIGS. 16 and 17, the structure of wire insertion device 80 is shown, wherein sleeve 82 and shaft 90 are carried in support member 180 to perform the functions heretofore described. Support member 180 is mounted to a pair of cylinders 190 and 200 by bolts 181. Cylinders 190 and 200 are in turn mounted on support plate 210 by bolts 211. Depending upon the specific embodiment of the wire insertion device selected from those heretofore discussed, support plate 210 may be mounted on a slide 301 by bolts 212 which slide may be movable along three axes, as in FIG. 15, or simply capable of translation from a first position near the stator terminal board to a second position away from the stator terminal board.

Support member 180 has three bores 182, 183, and 184 leading from its front face to a void 185. Rod extensions 191 and 201 mounted on the piston rods 192 and 202 of air cylinders 190 and 200, respectively, are slideably supported in the bores 182, 183 in support member 180. Sleeve 82 carrying guide bars 81 and shaft 90 is supported in bore 184 for sliding and rotating movement about its axis. Sleeve 82 has a groove 83 comprising straight and helical portions located on its inner bore 84. A pin 93 fixed on shaft 90 is slideably engaged in groove 83. Sleeve 82 also has a circumferential notch 85 near the end of sleeve 82 opposite the end on which the guide bars 81 are mounted. Arm 220 mounted on the rod extension 201 of piston arm 202 has a projection disposed in the notch 85 of sleeve 82 so that translational movement of piston arm 202 imparts translational and rotational movement to sleeve 82 as groove 83 slides along pin 93. A first straight portion of groove 83 provides translational movement of sleeve 82 towards stator terminal board 31; the helical portion of groove 83 rotates sleeve 82 and guide bars 81 to align the wire 53 with the slot 41 in terminal means 40. Thus, by changing the helical pitch of the groove 83 in sleeve 82, the wire 53 can be aligned for any predetermined orientation of the slot 41 of terminal means 40.

Arm 230 connects shaft 90 at the end opposite wire insertion tool 92 to the rod extension 191 of piston arm 192. Shaft 90 is mounted in a collar 231 of arm 230 by a nut 232, so that shaft 90 is capable only of translational movement. Sleeve 82 may be employed solely to align wire 53 with the slot 41 of terminal means 40, or may additionally act to partially insert the wire 53 into the slot 41 of terminal means 40. Shaft 90 is extended by the action of piston arm 192 through arm 230 to complete the insertion of the wire 53 into slot 41. Shaft 90 and sleeve 82 remain in position while hook mechanism 70 releases wire portion 53c and shuttle 60 is positioned to begin winding the next portion of coil 50 on stator pole 32. At this point, wire 53 is loosely wrapped around terminal means 40, but positioned so that it will not disengage from terminal means 40 when shaft 90 and sleeve 82 are retracted. Shaft 90 and sleeve 82 are retracted only when shuttle 60 resumes winding the next portion of coil 50, resulting in wire portion 53c being drawn tautly against the exterior of terminal means 40.

In the embodiment of wire insertion device 80 wherein the wire insertion device is centered on terminal means 40, hook mechanism 70 captures wire 53 and positions it so that when sleeve 82 of wire insertion device 80 is translated toward wire 53, guide bars 81 will pass on opposite sides of wire 53 (similar to FIG. 5, but centered and at some distance away from terminal means 40). In this case, piston 200 is actuated to advance sleeve 82, whereby pin 93 will cause sleeve 82 to first translate, rotate, and then translate as groove 83 travels along pin 93. At the conclusion of this movement, the guide bars 81 of sleeve 82 have not yet engaged wire 53, but are simply positioned on opposite sides of wire 53. Piston 192 is then actuated to translate shaft 90 forward. Because of the engagement of pin 93 in groove 83, the outwards translation of shaft 90 will cause sleeve 82 to rotate once again, thereby aligning wire 53 with slots 41 of terminal means 40. As shaft 90 completes its forward translation, insertion tool 92 contacts wire 53, inserts it into slot 41 and then urges wire 53 toward the base of slot 41 of terminal means 40. In this embodiment, sleeve 82 serves only to align wire 53 and does not assist in inserting wire 53 into slot 41.

In the embodiment of the wire insertion device wherein the wire insertion device is not centered on the terminal means, for example, as is shown in FIG. 5, it is necessary to have the base of cylinder 200 mounted on an additional cylinder in order to impart further translational movement to wire insertion device 80 to insert the wire 53 into the slot 41 of terminal means 40. This further translation must be performed after the wire insertion device has been aligned with terminal means 40, otherwise guide bars 81 might abut against terminal means 40 during the step of centering the wire insertion device on the slot 41. In this instance, the guide bars 81 of sleeve 82 engage and rotate wire 53 to the correct orientation while at some distance away from and while not yet centered on the terminal means. Wire insertion device 80 is then centered on the terminal means. This is followed by translation of wire device 80 towards stator terminal board 31 by actuating the additional cylinder (so that the end face of sleeve 82 is brought adjacent to terminal means 40), thereby preventing wire 53 from slipping off guide bars 81 during the successive insertion stage. Finally, piston 192 is actuated to translate shaft 90, thereby inserting wire 53 into the slot 41 of terminal means 40. In this instance, the stroke of piston 192 is only long enough to cause pin 93 to slide in the first straight portion of groove 83, and thereby avoids rotating sleeve 82 again. An alternative is to accomplish the additional translation toward the terminal means 40 by movement of the platform 300 of FIG. 15 towards the terminal board after guide bars 81 have been rotated to align the wire 53 with slot 41.

An alternate embodiment of the present invention, for use where orientation of the slot 41 in terminal means 40 does not require that sharp changes in the direction of the wire be made, includes a second hook mechanism and a guide placed over the terminal means. The second hook mechanism is located on a platform 300, such as that shown in FIG. 15, so that the hook mechanism is movable along three axes. After the wire strand 53 has been uncrossed, as shown by the phantom lines in FIG. 4, the second hook mechanism captures the wire and aligns it with a guide placed over the terminal means by moving parallel to the stator terminal board. The second hook mechanism then moves inward toward the terminal board so that the wire contacts the guide and is partially inserted in the slot 41 of terminal means 40. Wire insertion device 80 then completes the wire insertion.

Figure 18:
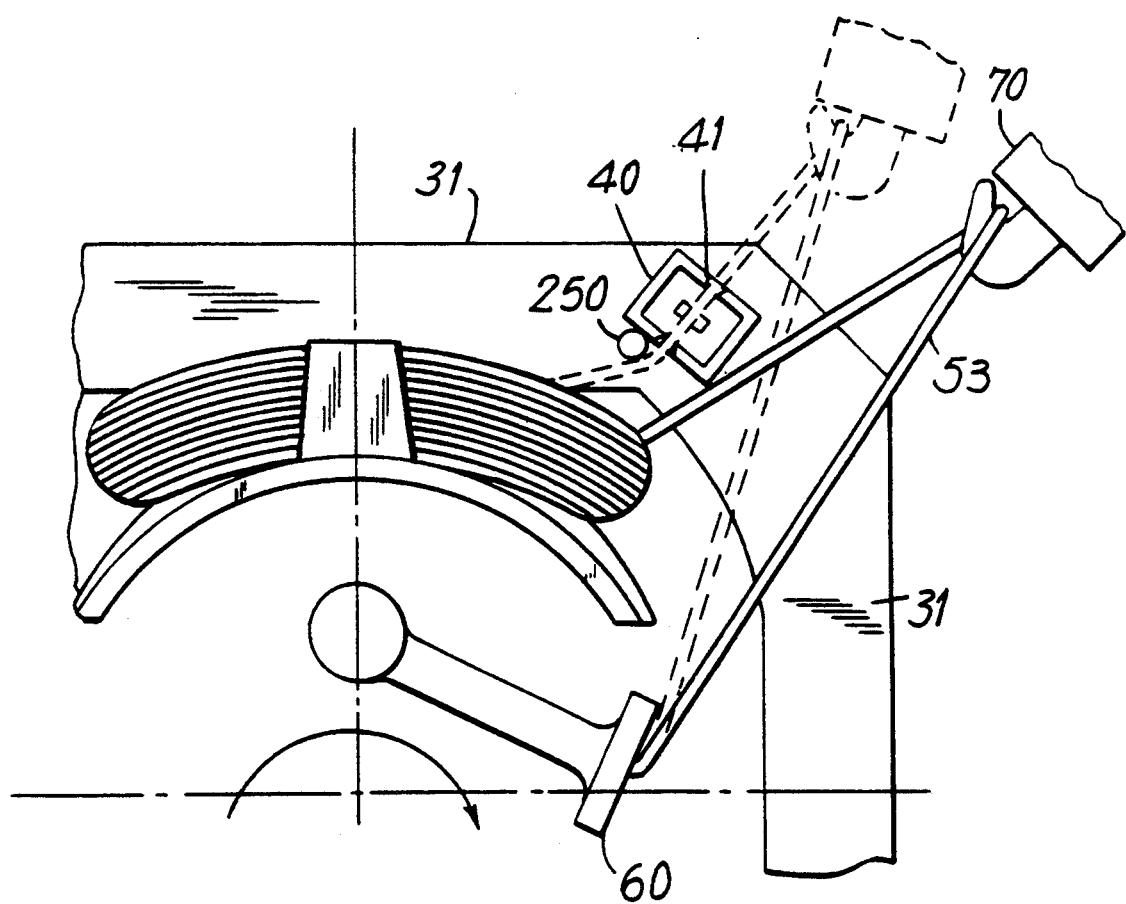
FIG. 18 is a view similar to FIG. 3 showing an alternate embodiment of practicing the method of the present invention.

In another alternate embodiment, shown in FIG. 18, a guide rod 250 is positioned near the slot 41 in terminal 40. After the hook mechanism has captured the strand of wire 53, the hook mechanism moves parallel to the stator terminal board so that the wire contacts guide rod 250. Further movement of the hook mechanism parallel to the stator terminal board aligns the wire 53 with the slot 41 in terminal means 40. The hook mechanism then moves inward toward the stator terminal board, causing the wire 53 to become partially inserted in slot 41. Wire insertion is completed by wire insertion device 80. For the purposes of this embodiment, guide bar 250 can be an integrally molded portion of terminal means 40.

We claim:

1. A method of winding a coil having two successively wound portions onto a stator core and securing an intermediate lead wire extending between said coil portions to terminal means associated with the stator core, said method comprising a series of steps of:
   providing a winding shuttle;
   actuating the winding shuttle to wind a first coil portion onto said stator core;
   stopping said winding shuttle adjacent said terminal means;
   yieldably grasping a strand of wire between said winding shuttle and said first coil portion;
   drawing a length of wire from the winding shuttle to define a strand of wire extending between said winding shuttle and said first coil portion;
   engaging said strand of wire at two points of engagement along said strand, said two points of engagement rotatable about a common axis;
   rotating said two points of engagement about said common axis to align said strand of wire with said terminal means;
   moving said strand of wire into engagement with said terminal means; and
   actuating the winding shuttle to wind a next coil portion onto said stator core, said strand of wire being retained by said terminal means.

2. The method as defined in claim 1 wherein said terminal means includes a slot and wherein the step of drawing a length of wire from the winding shuttle to define a strand of wire extending between said winding shuttle and said first coil portion comprises the steps of:
   providing hook means;
   moving said hook means along a path so that said hook means yieldably grasps said strand of wire between said winding shuttle and said first coil portion, said strand of wire increasing in length as said hook means moves along said path.

3. The method as defined in claim 1 wherein said terminal means includes a slot and wherein the step of moving said strand of wire into engagement with said terminal means comprises the steps of:
   centering said two points of engagement about said terminal means;
   contacting said strand of wire to said terminal means so that said strand of wire is aligned with said slot of said terminal means;
   providing a wire insertion device; and
   contacting said wire insertion device to said strand of wire to urge said strand of wire into said slot of said terminal means.

4. In a method of winding a coil having multiple portions onto a pole of a stator core and securing an intermediate lead wire extending between the coil portions to a terminal means mounted on the end of the stator core, the terminal means having an exterior, a series of steps comprising:
   providing a winding shuttle;
   actuating the winding shuttle to wind a first coil portion onto said stator core;
   stopping said winding shuttle adjacent the end of said stator core whereon said terminal means is mounted;
   providing hook means;
   moving said hook means along a path so that said hook means yieldably grasps a strand of wire at a first point of engagement between said winding shuttle and said first coil portion, said strand of wire increasing in length as said hook means moves along said path, said path being disposed proximate to said terminal means;
   engaging said strand of wire at a second point of engagement;
   moving said strand of wire into alignment with said terminal means;
   engaging said strand of wire with said terminal means; and
   actuating the winding shuttle to wind a next coil portion onto said stator core, said strand of wire being wrapped tightly against the exterior of said terminal means.

5. The method as defined in claim 4 wherein the step of moving said strand of wire into alignment with said terminal means comprises the step of:
   rotating said strand of wire between said two points of engagement.

6. The method as defined in claim 4 wherein said terminal means includes a slot and wherein the step of engaging said strand of wire with said terminal means further comprises the steps of:
   contacting said strand of wire to said terminal means so that said strand of wire is partially engaged in said slot of said terminal means;
   providing a wire insertion device; and
   contacting said wire insertion device to said strand of wire to urge said strand of wire into said slot of said terminal means.

7. In a method of winding a coil having multiple portions onto a pole of a stator core and securing an intermediate lead wire extending between the coil portions to a terminal means mounted on the end of the stator core, the terminal means having an exterior, a series of steps comprising:
   providing a winding shuttle;
   actuating said winding shuttle to wind a first coil portion onto said stator core;
   stopping said winding shuttle adjacent the end of said stator core whereon said terminal means is mounted;
   providing a hook means;
   yieldably grasping a strand of wire between said winding shuttle and said first coil portion with said hook means;
   moving said hook means along a path to draw a length of wire from said winding shuttle to lengthen said strand of wire extending between said first coil portion and said hook means;
   moving said hook means to a position so that said strand of wire is located proximate said terminal means;
   aligning said strand of wire with said terminal means;
   inserting said strand of wire into said terminal means; and
   releasing said strand of wire from said hook means while retaining said strand of wire in said terminal means so that when said winding shuttle begins winding a next coil portion onto said stator core, said strand of wire is wrapped tightly against the exterior of said terminal means.

8. In a method of winding a coil having multiple portions onto a pole of a stator core and securing an intermediate lead wire extending between the coil portions to a terminal means mounted on the end of the stator core, the terminal means having an exterior, a series of steps comprising:
   providing a winding shuttle;

actuating said winding shuttle to wind a first coil portion onto said stator core;

stopping said winding shuttle adjacent the end of said stator core whereon said terminal means is mounted;

providing a hook means;

engaging a strand of wire at a first point of engagement between said winding shuttle and said first coil portion with said hook means;

engaging said strand of wire at a second point of engagement along said strand of wire, said first and second points of engagement rotatable about a common axis;

centering said two points of engagement about said terminal means;

aligning said strand of wire with said terminal means;

inserting said strand of wire into said terminal means; and releasing said strand of wire from said hook means while retaining said strand of wire in said terminal means so that when said winding shuttle begins winding a next coil portion onto said stator core, said strand of wire is wrapped tightly against the exterior of said terminal means.

9. The method as defined in claim 8 wherein the step of aligning said strand of wire with said terminal means comprises the step of rotating said two points of engagement about said common axis to align said strand of wire with said slot of said terminal means.

10. In a method of winding a coil having multiple portions onto a pole of a stator core and securing an intermediate lead wire extending between the coil portions to a terminal means mounted on the end of the stator core, the terminal means having an exterior and a slot, a series of steps comprising:

providing a winding shuttle;

actuating said winding shuttle to wind a first coil portion onto said stator core;

stopping said winding shuttle adjacent the end of said stator core whereon said terminal means is mounted;

providing a hook means;

engaging a strand of wire between said winding shuttle and said first coil portion with said hook moving said hook means to a position so that said strand of wire is located proximate said terminal means;

aligning said strand of wire with said terminal means;

contacting said strand of wire to said terminal means so that said strand of wire is partially engaged with said slot of said terminal means;

providing a wire insertion device;

contacting said wire insertion device to said strand of wire to urge said strand of wire into said slot of said terminal means and;

releasing said strand of wire from said hook means while retaining said strand of wire in said terminal means so that when said winding shuttle begins winding a next coil portion onto said stator core, said strand of wire is wrapped tightly against the exterior of said terminal means.

11. The method as defined in claim 5 wherein said strand of wire between said two points of engagement has a mid-point and the step of rotating said strand of wire between said two points of engagement further comprises rotating said strand of wire about said mid-point.

12. The method as defined in claim 5 wherein the step of rotating said strand of wire between said two points of engagement further comprises rotating said strand of wire about said first point of engagement.

13. The method as defined in claim 5 wherein the step of rotating said strand of wire between said two points of engagement further comprises rotating said strand of wire about said second point of engagement.

14. The method as defined in claim 8 wherein said terminal means includes a slot and wherein the step of inserting said strand of wire into said terminal means comprises the steps of:

contacting said strand of wire to said terminal means so that said strand of wire is partially engaged in said slot of said terminal means;

providing a wire insertion device; and contacting said wire insertion device to said strand of wire to urge said strand of wire into said slot of said terminal means.

15. In a method of winding a coil having multiple portions onto a pole of a stator core and securing an intermediate lead wire extending between the coil portions to a terminal means mounted on the end of the stator core, the terminal means including an exterior and a slot having a longitudinal axis, a series of steps comprising:

providing a winding shuttle;

actuating said winding shuttle to wind a first coil portion onto said stator core;

stopping said winding shuttle adjacent the end of said stator core whereon said terminal means is mounted;

providing a hook means;

engaging a strand of wire at a first point of engagement between said winding shuttle and said first coil portion with said hook means;

engaging said strand of wire at a second point of engagement along said strand of wire, said strand of wire located between said first and second points of engagement having a longitudinal axis, said first and second points of engagement rotatable about a common axis;

rotating said strand of wire relative to said terminal means so that said longitudinal axis of said strand of wire is parallel to said longitudinal axis of said slot;

aligning said strand of wire with said terminal means;

inserting said strand of wire into said terminal means; and releasing said strand of wire from said hook means while retaining said strand of wire in said terminal means so that when said winding shuttle begins winding a next coil portion onto said stator core, said strand of wire is wrapped tightly against the exterior of said terminal means.

16. The method as defined in claim 14 wherein the step of aligning said strand of wire with said terminal means further comprises the step of centering said two points of engagement about said terminal means.

* * * * *